(12) United States Patent
Mody et al.

(10) Patent No.: US 11,172,172 B2
(45) Date of Patent: Nov. 9, 2021

(54) EFFICIENT AND FLEXIBLE COLOR PROCESSOR

(71) Applicant: TEXAS INSTRUMENTS INCORPORATED, Dallas, TX (US)

(72) Inventors: Mihir Narendra Mody, Bangalore (IN); Shashank Dabral, Allen, TX (US); Rajasekhar Allu, Plano, TX (US); Niraj Nandan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/395,001

(22) Filed: Dec. 30, 2016

(65) Prior Publication Data
US 2018/0192020 A1 Jul. 5, 2018

(51) Int. Cl.
   *H04N 9/04* (2006.01)
   *G06T 1/20* (2006.01)
   *H04N 9/67* (2006.01)

(52) U.S. Cl.
   CPC ........... *H04N 9/04515* (2018.08); *G06T 1/20* (2013.01); *H04N 9/67* (2013.01); *H04N 2209/046* (2013.01)

(58) Field of Classification Search
   CPC .. H04N 1/46; H04N 5/23219; H04N 1/00724; H04N 1/00737; H04N 1/00766;
   (Continued)

(56) References Cited

U.S. PATENT DOCUMENTS 5,450,500 A * 9/1995 Brett .................. H04N 9/11
                                                    348/649
5,631,468 A * 5/1997 Dellacorna ............. H04N 5/33
                                                    250/332
(Continued)

FOREIGN PATENT DOCUMENTS

CN 1588186 A 3/2005
CN 1972456 A 5/2007
(Continued)

OTHER PUBLICATIONS

Notification of First CN Office Action; PRC Pat. Appln. No. 201711452832.7; dated Feb. 5, 2021; 3 pages.
(Continued)

*Primary Examiner* — Anthony J Daniels
(74) *Attorney, Agent, or Firm* — Charles F. Koch; Charles A. Brill; Frank D. Cimino

(57) ABSTRACT

An image signal processor includes a first matrix processing circuit, a post processing circuit, a second matrix processing circuit, and a split visual and analytics circuit. The first matrix processing circuit is configured to receive a plurality of component images generated based on an image captured by an image sensor and generate a plurality of first matrix outputs based on the plurality of component images. The post processing circuit is configured to perform color conversion on the plurality of first matrix outputs to generate a first luminance component of the image and a chrominance component of the image. The second matrix processing circuit is configured to perform color conversion on the plurality of first matrix outputs to generate a second luminance component of the image and a saturation component of the image. The split visual and analytics circuit is configured to generate visual and analytic data of the image.

20 Claims, 5 Drawing Sheets

(58) Field of Classification Search
CPC ........ H04N 1/60; H04N 1/6077; H04N 9/045; H04N 9/64; H04N 9/646; H04N 9/67; H04N 9/68; H04N 9/78; G06T 11/001; G09G 2320/0242; G09G 5/02
USPC ........................................................ 348/234
See application file for complete search history.

(56) References Cited

U.S. PATENT DOCUMENTS

| | | | | |
|---|---|---|---|---|
| 8,396,324 | B2* | 3/2013 | Kang | G06K 9/00664 348/607 |
| 2007/0273776 | A1* | 11/2007 | Lee | H04N 5/202 348/254 |
| 2010/0231747 | A1* | 9/2010 | Yim | H04N 9/643 348/223.1 |
| 2012/0120217 | A1* | 5/2012 | Sasaki | A61B 1/00006 348/65 |
| 2013/0278726 | A1* | 10/2013 | Muhammad | H04N 9/045 348/46 |
| 2015/0379698 | A1* | 12/2015 | Kuramoto | G06T 5/009 382/128 |
| 2018/0096481 | A1* | 4/2018 | Schwartz | G06K 19/06 |

FOREIGN PATENT DOCUMENTS

| | | |
|---|---|---|
| CN | 101083773 A | 12/2007 |
| CN | 101523480 A | 9/2009 |

OTHER PUBLICATIONS

First CN Office Action and Translation; PRC Pat. Appln. No. 201711452832.7; dated Feb. 5, 2021; 18 pages.

* cited by examiner

EFFICIENT AND FLEXIBLE COLOR PROCESSOR

BACKGROUND

In digital image processing an image sensor typically is overlaid with a color filter array (CFA) comprised of a mosaic of color filters. The mosaic of color filters are configured to filter the light passing through the mosaic of filters, and thus received by the image sensor, by wavelength. A de-mosaicing or CFA interpolation algorithm is then utilized to generate a full color image from the raw image sensor captured data. Conventional de-mosaicing techniques utilize a unique algorithm that is tuned for a given CFA format (e.g., Bayer, Red/Clear color filter (RCCC), etc.).

SUMMARY

The problems noted above are solved in large part by systems and methods for color processing an image captured by an image sensor. In some embodiments, an image signal processor includes a first matrix processing circuit, a post processing circuit, a second matrix processing circuit, and a split visual and analytics circuit. The first matrix processing circuit is configured to receive a plurality of component images generated based on an image captured by an image sensor. The first matrix processing circuit is also configured to generate a plurality of first matrix outputs based on the plurality of component images. The post processing circuit is configured to perform color conversion on the plurality of first matrix outputs to generate a first luminance component of the image and a chrominance component of the image. The second matrix processing circuit is configured to perform color conversion on the plurality of first matrix outputs to generate a second luminance component of the image and a saturation component of the image. The split visual and analytics circuit is configured to generate visual data of the image and analytic data of the image.

Another illustrative embodiment is an image processing system that includes a filter array, an image sensor coupled to the filter array, and an image sub-system. The filter array is configured to filter electromagnetic waves. The image sensor includes a plurality of pixel sensors. Each of the pixel sensors is configured to receive the electromagnetic waves after being filtered by the filter array and convert the received electromagnetic waves into electrical signals based on the intensity of the electromagnetic waves at each pixel sensor to generate a plurality of image pixels. The image sub-system includes an image signal processor. The image signal processor is configured to generate a plurality of component images based on the plurality of image pixels. The image signal processor is also configured to generate a plurality of first matrix outputs based on the plurality of component images. The image signal processor is also configured to color convert the plurality of first matrix outputs to generate a first luminance component and a chrominance component of the plurality of image pixels. The image signal processor is also configured to color convert the plurality of first matrix outputs to generate a second luminance component and a saturation component of the plurality of image pixels. The image signal processor is also configured to generate visual data and analytic data of the plurality of image pixels.

Yet another illustrative embodiment is a method for color processing an image captured by an image sensor. The method includes generating a plurality of first matrix outputs based on a plurality of component images generated based on the image. The method also includes color converting the plurality of first matrix outputs to generate a first luminance component and a chrominance component of the image. The method also includes color converting the plurality of first matrix outputs to generate a second luminance component and a saturation component of the image. The method also includes generating visual data and analytic data of the image.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In digital image processing an image sensor typically is overlaid with a color filter array (CFA) comprised of a mosaic of color filters. The mosaic of color filters are configured to filter the light passing through the mosaic of filters, and thus received by the image sensor, by wavelength. A de-mosaicing or CFA interpolation algorithm is then utilized to generate a full color image from the raw image sensor captured data. Conventional de-mosaicing techniques utilize a unique algorithm that is tuned for a given CFA format (e.g., Bayer, Red/Clear color filter (RCCC), etc.). Additional color processing is then performed on the de-mosaiced images. However, different topologies have begun to emerge with multiple new sensor formats emerging. Conventional color processors require different algorithms for generating visual images and for analytic data for use by machines. As such, there is a need for a scalable flexible solution to address current and future image sensors and filters.

Figure 1:
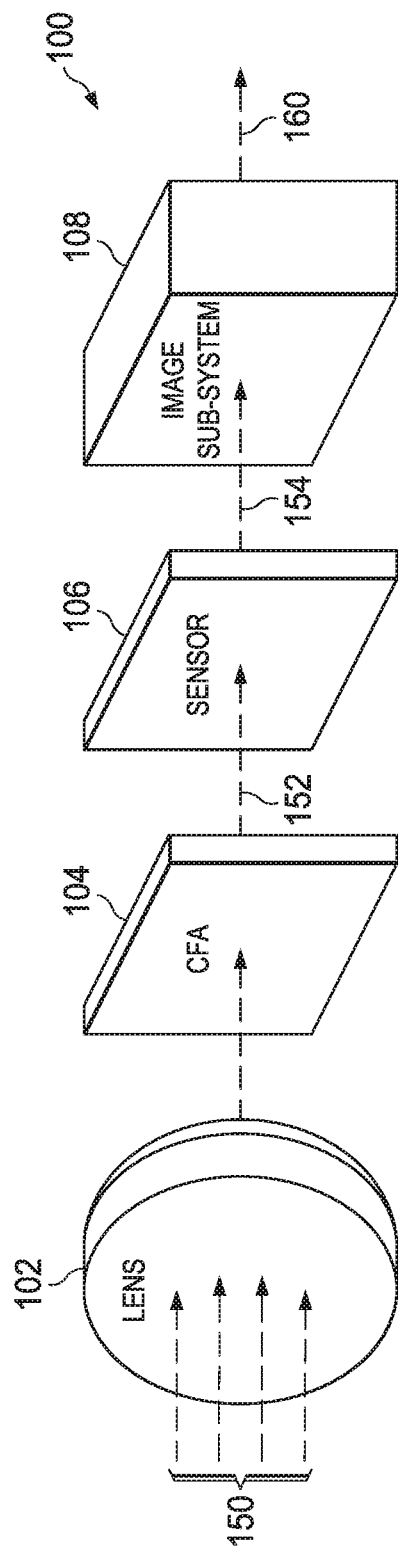
FIG. 1 shows an illustrative block diagram of an image processing system in accordance with various examples.

FIG. 1 shows an illustrative block diagram of an image processing system 100 in accordance with various examples. The image processing system 100 may include a lens 102, CFA 104, image sensor 106, and image sub-system 108. Electromagnetic waves 150 are configured to pass through lens 102 to be filtered by CFA 104 prior to being captured by the image sensor 106. The electromagnetic waves 150 may include visible light of various colors, infrared waves, ultraviolet waves, microwaves, radio waves, etc., or any combination thereof. Lens 102 may be any type of transmissible optical device that is configured to focus the electromagnetic waves 150 onto the image sensor 106 via the CFA 104. For example, lens 102 may be a simple lens, a compound lens, a microwave lens, an electron lens, an acoustic lens, etc.

CFA 104 may be a mosaic of filters configured to filter the electromagnetic waves 150 by wavelength. For example, CFA 104 may be a Bayer filter. In a Bayer filter, a mosaic of visible light filters are arranged, such that 50% of the filters allow green light through the filter, 25% allow red light through the filter, and 25% allow blue light through the filter. Furthermore, the pattern of green, red, and blue filters make up a 2×2 grid pattern (i.e., for any given four adjacent 2×2 pixels, 2 filters are green filters, 1 filter is a red filter, and 1 filter is a blue filter). In alternative embodiments, CFA 104 may be any other type of filter, such as a RGBE (red, green, blue, emerald) filter, a RCCC filter, a RGB-IR (red, green, blue, infrared) filter, etc. and may be in the form of a 2×2 grid, 4×4 grid, etc.

Each of the filters in the CFA 104 may be arranged to cover a single pixel sensor of image sensor 106. Image sensor 106 may be any type of imaging sensor that is comprised of a plurality of pixel sensors, each configured to convert the filtered electromagnetic waves 152 into electrical signals based on the intensity of the received electromagnetic waves. In some embodiments, the image sensor 106 is a semiconductor charge-coupled device (CCD) while, in alternative embodiments, the image sensor 106 includes active pixel sensors on a complementary metal-oxide-semiconductor (CMOS) sensor chip. Because each pixel sensor is covered by a filter of the CFA 104, each pixel sensor detects the intensity of a specific type of electromagnetic wave. For example, some pixel sensors of the image sensor 106 may detect the intensity of blue visible light, some pixel sensors of the image sensor 106 may detect the intensity of red visible light, some pixel sensors of the image sensor 106 may detect the intensity of infrared light, etc.

The image sub-system 108 is configured to receive the raw pixel data 154 detected by the pixel sensors of the image sensor 106 and provide image processing to the raw pixel data to improve visual quality of the captured image and output full color image 160 from the captured data. More particularly, the image sub-system 108 includes circuits that support a heterogeneous sensor architecture (e.g., sensors that are configured to sense two different types of electromagnetic waves, e.g., visual light and infrared light).

Figure 2:
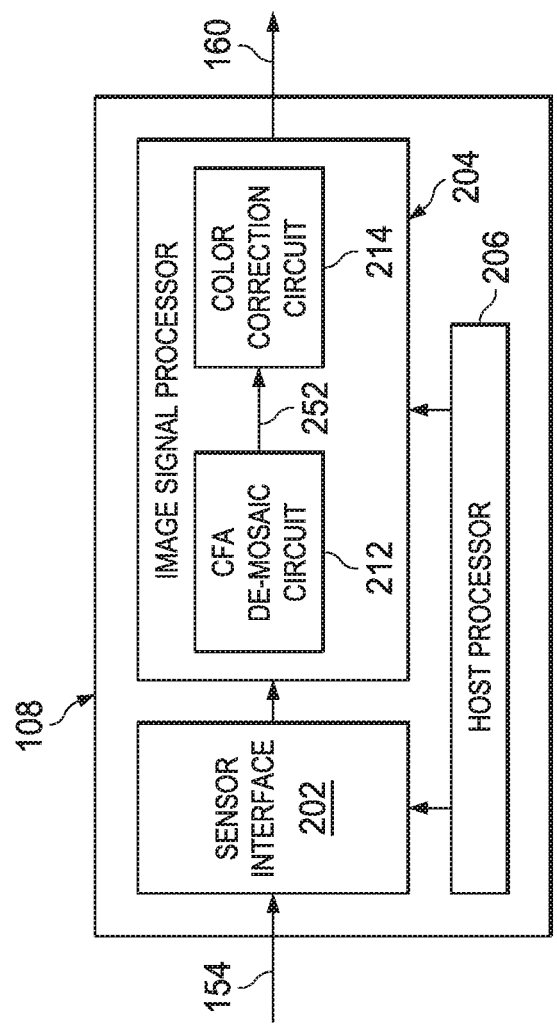
FIG. 2 shows an illustrative block diagram of an image sub-system included in an image processing system in accordance with various examples.

FIG. 2 shows an illustrative block diagram of image sub-system 108 included in image processing system 100 in accordance with various examples. The image sub-system 108 may include a sensor interface 202, an image signal processor 204, and a host processor 206. The sensor interface 202 may be a controller for interfacing with the image sensor 106 to enable the image sub-system 108 to receive the raw pixel data 154. The sensor interface 202 may be a parallel interface or a serial interface. In embodiments where sensor interface 202 is a parallel interface, the sensor interface 202 may consist of a parallel bus containing video data along with HSync and Vsync signals per the ITU-T standards to enable receiving the raw pixel data 154. In embodiments where sensor interface 202 is a serial interface, the sensor interface 202 may support receiving the raw pixel data 154 serially utilizing low-voltage differential signaling (LVDS).

The image signal processor 204 may include a CFA de-mosaic circuit 212 and a color correction circuit 214. The CFA de-mosaic circuit 212 is configured to de-mosaic the raw pixel data 154. In other words, the CFA de-mosaic circuit 212 is configured to perform CFA interpolation of the raw pixel data 154 to generate component images 252. Each component image 252 is interpolated raw pixel data for a single component of the raw pixel data to form a complete image in the single component. For example, if the CFA 104 is a Bayer filter, then one component image would be a complete image of the intensity of red light as captured by the image sensor 106. Because only 25% of the pixels will include data indicative of the intensity of red light, the de-mosaic circuit 212 interpolates the intensity of red light for the pixels that have filtered the red light. In other words, the CFA de-mosaic circuit 212 performs interpolation of the red light component at every pixel position from the image sensor 106. A second component image would be a complete image of the intensity of blue light as captured by the image sensor 106 in a similar manner. A third component image would be a complete image of the intensity of green light as captured by the image sensor 106 in a similar manner. A component image 252 may be a complete image of the intensity of infrared light as captured by the image sensor 106 as well. Thus, in some embodiments, CFA de-mosaic circuit 212 may generate four component images 252.

The color correction circuit 214 may be configured to provide color correction to generate visual data (e.g., a full color image for the captured electromagnetic waves 150 for viewing by a human), grayscale data (e.g., a grayscale version of the image for the captured electromagnetic waves 150), analytic data (i.e., data to be used for analysis by a machine), and/or non-linear image data (e.g., hue, saturation, and intensity (HSI), hue, saturation, and value (HSV), and/or hue, saturation, and light (HSL) color data). Thus, the color correction circuit 214 may generate image data 160 for the captured electromagnetic waves 150 that provides different types of data that may be utilized by an end user (e.g., a human or a machine). The host processor 206, may be configured to control the image sub-system 108. Both the image signal processor 204 and/or the host processor 206 may be any hardware that carries out computer instructions by performing, for example, arithmetic, logical, and input/output (I/O) operations. Image signal processor 204 and/or host processor 206 may include a central processing unit (CPU), a semiconductor-based microprocessor, a graphics processing unit (GPU), a digital signal processor (DSP), and/or other hardware devices suitable for retrieval and execution of instructions that may be stored in memory. Additionally, image signal processor 204 and/or the host processor 206 may include a single processor, multiple processors, a single computer, a network of computers, or any other type of processing device. For example, image signal processor 204 and/or the host processor 206 may include multiple cores on a chip, multiple cores across multiple chips, multiple cores across multiple devices, or combinations thereof. Image signal processor 204 and/or the host processor 206 may include at least one integrated circuit (IC), other control logic, other electronic circuits, or combinations thereof that include a number of electronic components.

Figure 3:
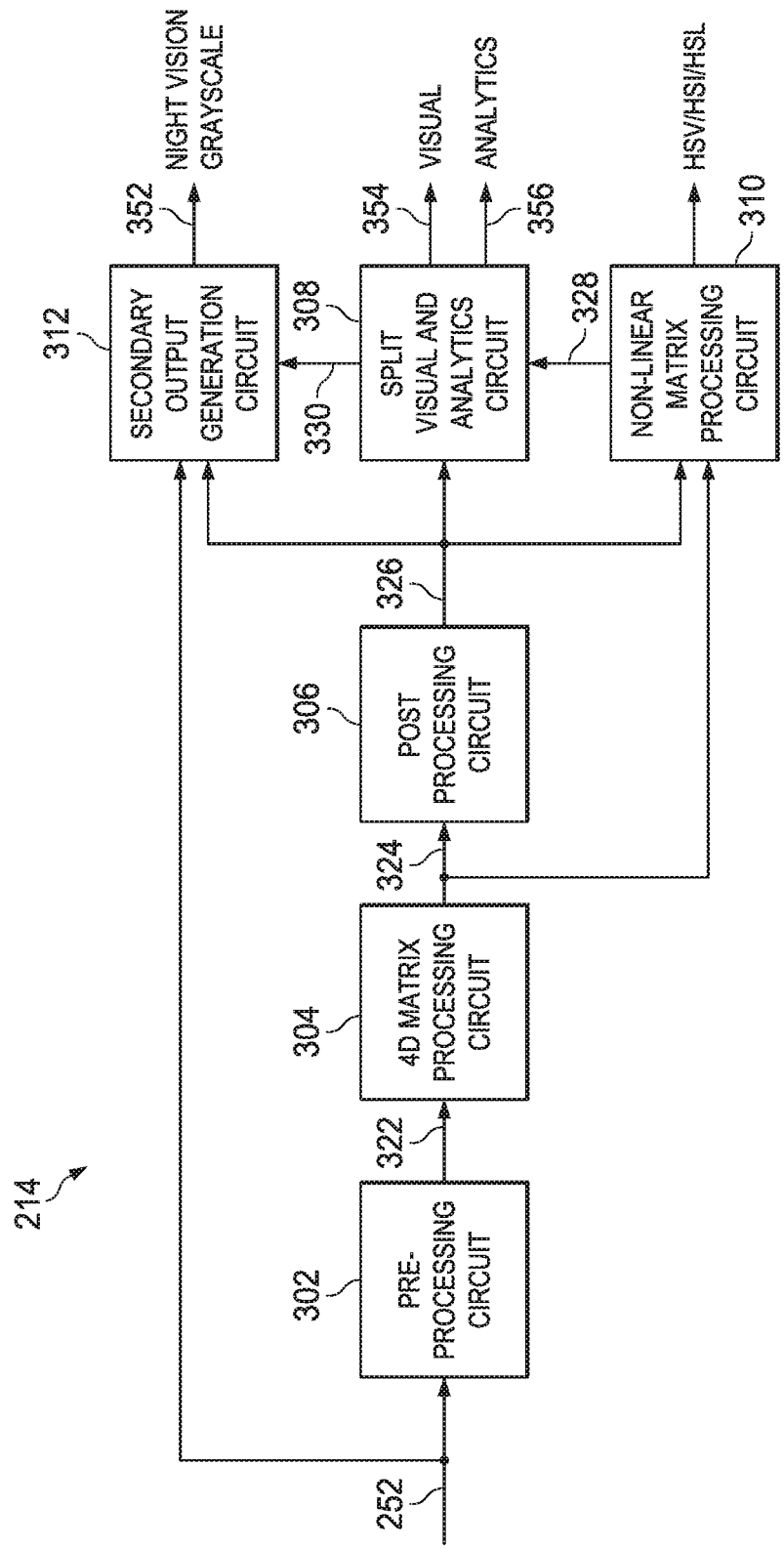
FIG. 3 shows an illustrative block diagram of a color correction circuit included in an image signal processor of an image processing system in accordance with various examples.

FIG. 3 shows an illustrative block diagram of color correction circuit 214 included in an image signal processor of an image processing system in accordance with various examples. The color correction circuit 214 may include a pre-processing circuit 302, a four dimensional (4D) matrix processing circuit 304, a post processing circuit 306, a split visual and analytics circuit 308, a non-linear matrix processing circuit 310, and a secondary output generation circuit 312. In some embodiments, the component images 252 may be received by the pre-processing circuit 302 which may be configured to pre-process the component images 252 to prepare the color images for further processing. For example, the pre-processing circuit 302 may be configured to correct certain defects in the component images 252 utilizing a noise filter to generate the pre-processing circuit output 322, which then may be received by the 4D matrix processing circuit 304 for processing.

The 4D matrix processing circuit 304 is configured to generate one or more matrix outputs 324 based on the received component images 252 which, as discussed above, may be in the form of output 322. More particularly, the 4D matrix processing circuit 304 is configured to generate the matrix outputs 324 based on the following calculations:

$$E1(x,y)=W_{11}C_{252a}(x,y)+W_{12}C_{252b}(x,y)+W_{13}C_{252c}(x,y)+W_{14}C_{252d}(x,y)+O_1$$

$$E2(x,y)=W_{21}C_{252a}(x,y)+W_{22}C_{252b}(x,y)+W_{23}C_{252c}(x,y)+W_{24}C_{252d}(x,y)+O_2$$

$$E3(x,y)=W_{31}C_{252a}(x,y)+W_{32}C_{252b}(x,y)+W_{33}C_{252c}(x,y)+W_{34}C_{252d}(x,y)+O_3$$

where E1-E3 are the matrix outputs 324, W11-W34 are various weight values, C252a-d are the component images, (in this embodiment, four component images) received from the CFA de-mosaic circuit 212 (e.g., via the pre-processing circuit 302), and O1-3 are various offset values. The weight values W11-34 and offset values O1-3 may be determined based on the type of image sensor 106. Thus, the 4D matrix processing circuit 304 may be programmed to generate the weight values W11-W34 and the offset values O1-3 based on the type of image sensor 106. For example, the following table lists various weight values W11-W34 and offset values O1-3 that may be utilized for various image sensor types. In this way, the 4D matrix processing circuit may be able to generate matrix outputs 324 for a wide variety of image sensor types.

| Image Sensor Type | Weight and Offset Settings |
| --- | --- |
| Bayer RGB | W14/W24/W34 = 0. Other weights and offsets are set based on a standard RGB to RGB color correction block. |
| Bayer CMY | W11/W22/W33 = −1 (3840). O1-3 = +1 (2048). Others weights are set as zero. |
| Bayer RCBC | W14/W24/W34 = 0. Other weights are set for RGB to RGB conversion as per manufacturer guidelines. |
| RGB-IR | W14/W24/W34 is set to −1 (3840). Other weights and offsets are set based on a standard RGB to RGB color correction block or only diagonals to unity. |
| RCCC | W22 = 1(256). Other weights and offsets = 0 |
| RGBC | Set weights for color correction or reinforce G channel with Clear. |
| Misc functionality | Weights can be set in custom way. |

The post processing circuit 306 receives the matrix outputs 324 and is configured to perform color conversion on the matrix outputs 324 to generate YUV color model image components. For example, the post processing circuit 306 may be configured to generate a luminance component (i.e., Y component) and two chrominance components (i.e., a U component and a V component) (collectively, the post processing circuit output 326). In some embodiments, prior to performing the color conversion, the post processing circuit 306 may perform gamma compression and/or a contrast stretch on the matrix outputs 324. Furthermore, the two chrominance components may be downsampled from the 444 format to the 420 format to reduce resolution in the chrominance components by as much as 50% in both the horizontal and vertical direction.

The non-linear matrix processing circuit 310 may also receive the matrix outputs 324 and be configured to perform color conversion on the matrix outputs 324 to generate HSI, HSL and/or HSV color model image components. For example, the non-linear matrix processing circuit 310 may be configured to generate a hue component (i.e., H component), a saturation component (i.e., S component), and/or luminance component (i.e., I component, L component, and/or V component) (collectively, the non-linear image data 328).

The split visual and analytics circuit 308 may receive the post processing circuit output 326 and/or the non-linear matrix processing circuit output 328 and be configured to generate visual data 354 of image captured by the image sensor 106 and/or analytic data 356 of the image captured by the image sensor 106. In other words, the split visual and analytics circuit 308 may generate both visual data 354, which, in some embodiments, includes a full color image for the captured electromagnetic waves 150 for viewing by a human and analytic data, which, in some embodiments, includes data to be used for analysis by a machine. For example, visual data may need to be in 8 bits while analytic data may need to be in 12 bits. Thus, the split visual and analytics circuit 308 may receive 12 bit luminance component (Y) and chrominance components (UV) from the post processing circuit 306 and/or 12 bit saturation component (S) from the non-linear matrix processing circuit 310 and convert those components into 8 bit components. The split visual and analytics circuit 308 then may output the 8 bit luminance component (Y) and chrominance components (UV) and/or 8 bit saturation component (S) as the visual data 354. The split visual and analytics circuit 308 may also output the 12 bit chrominance components (UV) from the post processing circuit 306 as the analytics data 356. In this way, both visual data and analytical data may be generated from the same data pipeline.

The secondary output generation circuit 312 may receive both the luminance components, the Y component from the post processing circuit 306 and the I component, L component, and/or V component from the non-linear matrix processing circuit 310. The secondary output generation circuit 312 may select one and/or both of the luminance components to output a grayscale version 352 of the image. In this manner, a single circuit block that includes the pre-processing circuit 302, the 4D matrix processing circuit 304, the post processing circuit 306, the split visual and analytics circuit 308, the non-linear matrix processing circuit 310, and the second output generation circuit 312 may concurrently generate a grayscale version of an image, a visual component of the image, and analytical data regarding the image captured by any type of image sensor.

Figure 4:
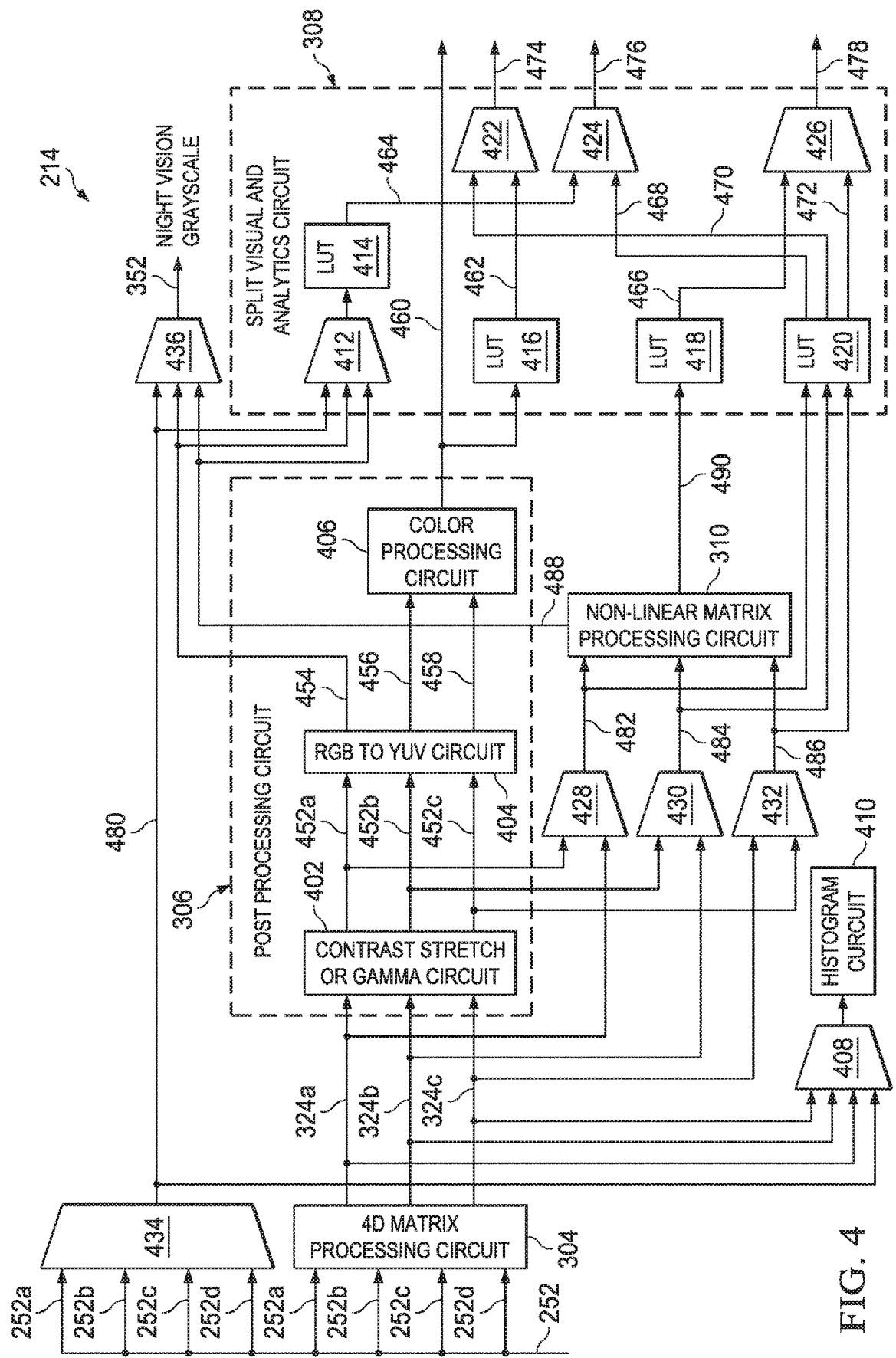
FIG. 4 shows an illustrative block diagram of a color correction circuit included in an image signal processor of an image processing system in accordance with various examples.

FIG. 4 shows an illustrative block diagram of color correction circuit 214 included in an image signal processor of an image processing system in accordance with various examples. The color correction circuit 214 shown in FIG. 4 is a more detailed version of the color correction circuit 214 shown in FIG. 3. Thus, the color correction circuit 214 may receive the component images 252a-d. While not shown in FIG. 4, the component images 252a-d may be pre-processed as discussed above and then received by the 4D matrix processing circuit 304. As discussed above, the 4D matrix processing circuit is configured to generate matrix outputs 324a-c. In addition to being received by the 4D matrix processing circuit 304, a multiplexer 434 may also receive the component images 252a-d. The multiplexer 434 may be programmed to select any of the component images 252a-d based on the type of image sensor 106 being utilized to generate a selected signal 480. For example, for a Bayer RGB sensor, the multiplexer 434 may be programmed to select any of the component images 252a-d as the selected signal 480. However, for a RCCC sensor, the multiplexer 434 may be programmed to select component image 252a as the selected signal 480.

The selected signal 480 and the matrix outputs 324a-c may be received by the multiplexer 408. The multiplexer 408 may be programmed to select one or more of the selected signal 480 and the matrix outputs 324a-c to be received by histogram circuit 410. The histogram circuit 410 may be configured to generate tone curves that may be utilized for contrast stretch in other parts of the image sub-system 108. The histogram circuit 410 may downsample the received image (i.e., via selected signal 480 and/or any of the matrix outputs 324a-c) in the horizontal and/or vertical direction by a factor of 2 using an averaging filter. The histogram circuit 410 may support a local memory which can be read by host processor 206. Thus, the downsampled versions of the images may be stored in this local memory for further processing by the host processor 206.

As discussed above, the matrix outputs 324a-c may also be received by the post processing circuit 306. The post processing circuit 306 may include a contrast stretch or gamma circuit 402, a RGB to YUV circuit 404, and a color processing circuit 406. The contrast stretch or gamma circuit 402 may be implemented in a look-up table (LUT) and configured to provide a gain and offset to stretch the histogram generated by the histogram circuit 410 and increase contrast in the matrix outputs 324a-c. The contrast stretch or gamma circuit 402 may also be configured to replace a standard gamma table for standard color processing. The resulting outputs 452a-c are received by the RGB to YUV circuit 404. The RGB to YUV circuit 404 is a circuit configured to convert the 12 bit RGB outputs 452a-c into 12 bit YUV components. The RGB to YUV circuit 404 may utilize a matrix based conversion as follows:

$$Y(x,y)=WRY*R(x,y)+WGY*G(x,y)+WBY*B(x,y)+O_1$$

$$U(x,y)=WRU*R(x,y)+WGU*G(x,y)+WBU*B(x,y)+O_2$$

$$V(x,y)=WRV*R(x,y)+WGV*G(x,y)+WBV*B(x,y)+O_3$$

where WRY, WGY, WBY, WRU, WGU, WBU, WRV, WGV, and WBV are weights and O1, O2, and O3 are offsets. The weights may be signed 12 bits with 8 bit of fraction precision representing a range of −8 to +7.996. The offsets may be signed 13 bits. The output Y component 454 (the luminance component) of the RGB to YUV circuit 404 may be received by multiplexer 436 and the split visual and analytics circuit 308. The output U component 456 and the V component 458 (collectively, the chrominance components) of the RGB to YUV circuit 404 may be received by the color processing circuit 406. The color processing circuit 406 may be configured to downsample the chrominance components 456 and 458 from 444 format to 420 format effectively reducing the chrominance resolution to 50% in both the horizontal and vertical direction. The downsamling may be performed using three tap filtering followed by decimation. Thus, the color processing circuit 406 may include two lines of memory for downsampling in the vertical direction. Conversion logic within the color processing circuit 406 then generates chrominance in a co-sited/co-located format in the horizontal and vertical direction and outputs the chrominance components 460 to be received by the split visual and analytics circuit 308.

Multiplexers 428-432 receive the matrix outputs 324a-c from the 4D matrix processing circuit 304 and the outputs 452a-c from the contrast stretch or gamma circuit 402. The multiplexer 428 is programmed to select either matrix output 324a or output 452a to generate a red (R) component 482. The multiplexer 430 is programmed to select either matrix output 324b or output 452b to generate a green (G) component 484. The multiplexer 432 is programmed to select either matrix output 324c or output 452c to generate a blue (B) component 486. The R component 482, G component 484, and B component 486 are received by the non-linear matrix processing circuit 310. As discussed above, the non-linear matrix processing circuit 310 is configured to generate a hue component (i.e., H component), a saturation component (i.e., S component) 490, and/or luminance component (i.e., I component, L component, and/or V component) 488.

Because visual data may be required to be in an 8 bit format and the luminance component 454, the chrominance components 460, R component 482, G component 484, and B component 486 may be 12 bit, the split visual and analytics circuit 308 may include LUTS 414-420. LUTS 414-420 are configured to downsample incoming 12 bit signals into 8 bit output signals.

The luminance component 488 is received by the multiplexer 412 which is programmed to select the output signal 480, the luminance component 454 and/or the luminance component 488. The output of the multiplexer 412 is received by LUT 414 where it is downsampled into an 8 bit signal, luminance component 464. The chrominance component 460 is received by the LUT 416 where it is downsampled into an 8 bit signal, chrominance component 462. The saturation component 490 is received by LUT 418 where it is downsampled into an 8 bit signal, saturation component 466. The R component 482, G component 484, and B component 486 are received by LUT 420 where they are downsampled into 8 bit signals, R component 468, G component 470, and B component 472.

The multiplexer 422 may be programmed to select the G component 484 or the chrominance component 462 to generate an 8 bit visual component 474. The multiplexer 424 may be programmed to select the R component 482 or the luminance component 464 to generate an 8 bit visual component 476. The multiplexer 426 may be programmed to select the B component 486 or the saturation component 466 to generate an 8 bit visual component 478. The 12 bit chrominance component 462 may also be provided as the analytic data for use by other machines. In this way, the visual data and the analytic data may be generated in parallel concurrently.

The multiplexer 436, which may be a part of secondary output generation circuit 312 receives the selected signal 480, the luminance component 454 from the RGB to YUV circuit 404, and the luminance component 488 from the non-linear matrix processing circuit 310. The multiplexer 436 may be programmed to select the selected signal 480, the luminance component 454 from the RGB to YUV circuit 404, and the luminance component 488 from the non-linear matrix processing circuit 310 based on the type of image sensor 106 being utilized to generate a selected signal 480. For example, for a Bayer RGB sensor, a Bayer CMY (cyan, magenta, yellow) sensor, a Bayer RCBC (red, clear, blue, clear) sensor, a RGB-IR sensor, and a RGBC (red, green, blue, clear) sensor, the multiplexer 434 may be programmed to select the luminance component 454 from the RGB to YUV circuit 404 or the luminance component 488 from the non-linear matrix processing circuit 310 to generate the grayscale version of the image 352. However, for a RCCC sensor, the multiplexer 436 may be programmed to select the selected signal 480 to generate the grayscale version of the image 352.

Figure 5:
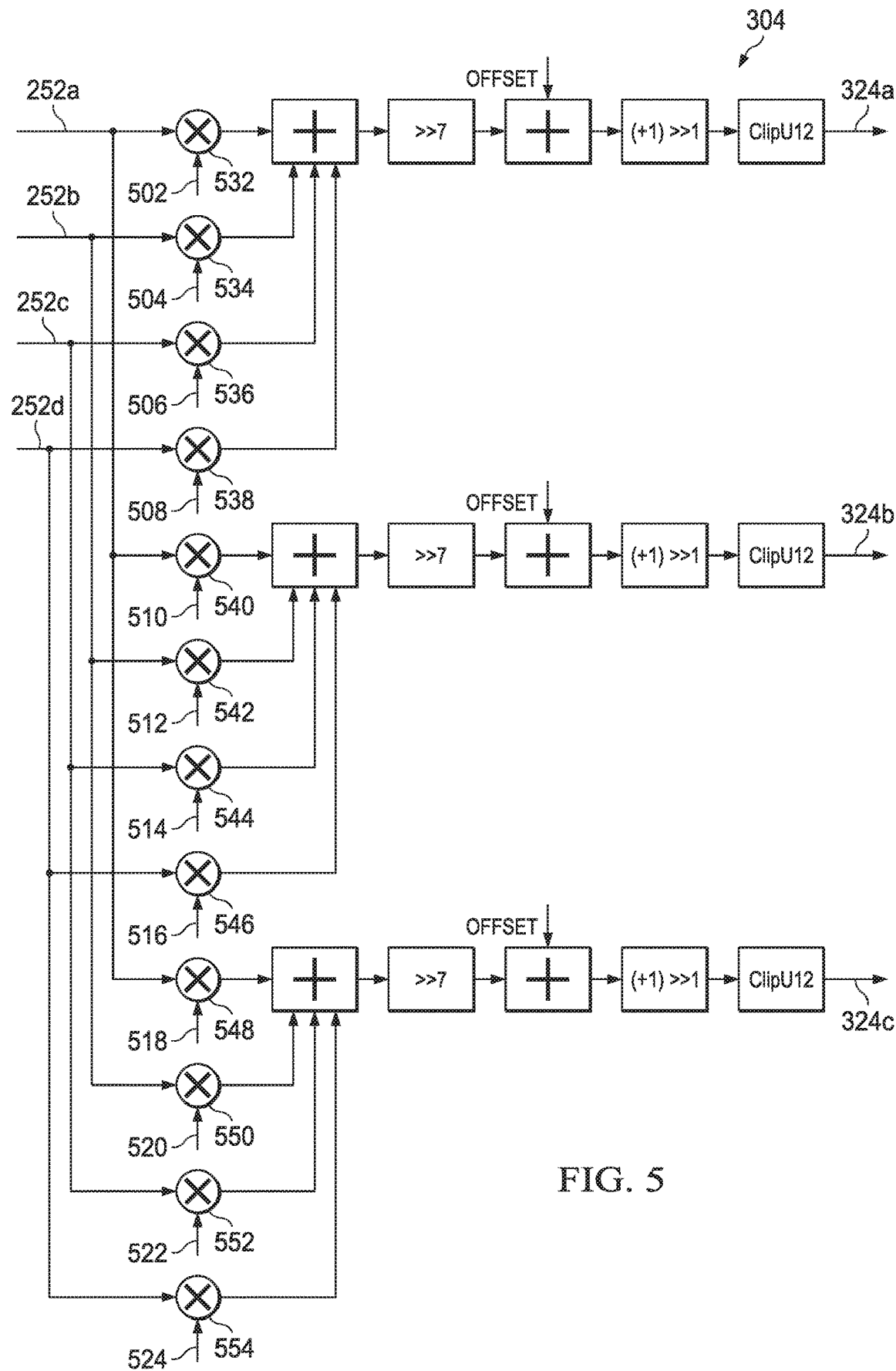
FIG. 5 shows an illustrative block diagram of a four dimensional matrix processing circuit included in a color correction circuit of an image processing system in accordance with various examples.

FIG. 5 shows an illustrative block diagram of 4D matrix processing circuit 304 included in color correction circuit 214 of image processing system 100 in accordance with various examples. As discussed above, the 4D matrix processing circuit 304 is configured to generate one or more matrix outputs 324a-c based on the received component images 252a-d. More particularly, the 4D matrix processing circuit 304 is configured to generate the matrix outputs 324a-c based on the following calculations:

$$E1(x,y) = W_{11}C_{252a}(x,y) + W_{12}C_{252b}(x,y) + W_{13}C_{252c}(x,y) + W_{14}C_{252d}(x,y) + O_1$$

$$E2(x,y) = W_{21}C_{252a}(x,y) + W_{22}C_{252b}(x,y) + W_{23}C_{252c}(x,y) + W_{24}C_{252d}(x,y) + O_2$$

$$E3(x,y) = W_{31}C_{252a}(x,y) + W_{32}C_{252b}(x,y) + W_{33}C_{252c}(x,y) + W_{34}C_{252d}(x,y) + O_3$$

where E1-E3 are the matrix outputs 324, W11-W34 are various weight values, C252a-d are the component images, (in this embodiment, four component images) received from the CFA de-mosaic circuit 212, and O1-3 are various offset values. Thus, the 4D matrix processing circuit 304 may include multipliers 532-554. To generate the matrix output 324a, the component image 252a may be multiplied, utilizing multiplier 532, with weight W11 (labelled as signal 502). Component image 252b may be multiplied, utilizing multiplier 534, with weight W12 (labelled as signal 504). Component image 252c may be multiplied, utilizing multiplier 536, with weight W13 (labelled as signal 506). Component image 252d may be multiplied, utilizing multiplier 538, with weight W14 (labelled as signal 508). The resulting products of multiplications by multipliers 532-538 are summed. In some embodiments, the sum is right shifted by 7 (divided by 128). That result may be added with the offset value O1 which may be right shifted by 1 (divided 2). The resulting value is conformed to 12 bits as resulting matrix output 324a.

Similarly, to generate the matrix output 324b, the component image 252a may be multiplied, utilizing multiplier 540, with weight W21 (labelled as signal 510). Component image 252b may be multiplied, utilizing multiplier 542, with weight W22 (labelled as signal 512). Component image 252c may be multiplied, utilizing multiplier 544, with weight W23 (labelled as signal 514). Component image 252d may be multiplied, utilizing multiplier 546, with weight W24 (labelled as signal 516). The resulting products of multiplications by multipliers 540-546 are summed. In some embodiments, the sum is right shifted by 7 (divided by 128). That result may be added with the offset value O2 which may be right shifted by 1 (divided 2). The resulting value is conformed to 12 bits as resulting matrix output 324b. To generate the matrix output 324c, the component image 252a may be multiplied, utilizing multiplier 548, with weight W31 (labelled as signal 518). Component image 252b may be multiplied, utilizing multiplier 550, with weight W32 (labelled as signal 520). Component image 252c may be multiplied, utilizing multiplier 552, with weight W33 (labelled as signal 522). Component image 252d may be multiplied, utilizing multiplier 554, with weight W34 (labelled as signal 524). The resulting products of multiplications by multipliers 548-554 are summed. In some embodiments, the sum is right shifted by 7 (divided by 128). That result may be added with the offset value O2 which may be right shifted by 1 (divided 2). The resulting value is conformed to 12 bits as resulting matrix output 324c.

Figure 6:
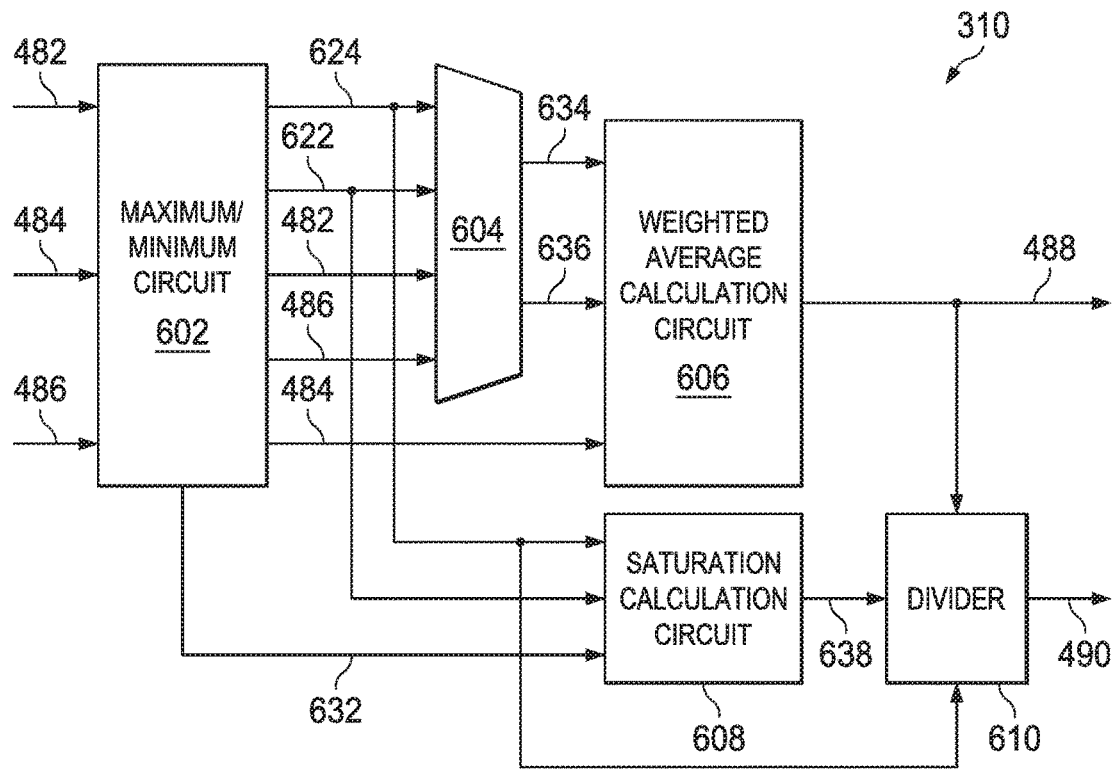
FIG. 6 shows an illustrative block diagram of a non-linear matrix processing circuit included in a color correction circuit of an image processing system in accordance with various examples.

FIG. 6 shows an illustrative block diagram of non-linear matrix processing circuit 310 included in color correction circuit 214 of image processing system 100 in accordance with various examples. As discussed above, the non-linear matrix processing circuit 310 is configured to perform color conversion on the matrix outputs 324 to generate HSI, HSL and/or HSV color model image components including a hue component (i.e., H component), a saturation component (i.e., S component), and/or luminance component (i.e., I component, L component, and/or V component).

The non-linear matrix processing circuit 310 may include a max/min circuit 602, a multiplexer 604, a weighted average calculation circuit 606, a saturation calculation circuit 608, and/or a divider 610. The max/min circuit 602 may be configured to receive the R component 482, G component 484, and B component 486 from the multiplexers 428-432. The max/min circuit 602 is configured to generate a maximum value 622 from the R component 482, G component 484, and B component 486. For example, if the maximum value amongst the R component 482, G component 484, and B component 486 is the G component 482, then the max/min circuit 602 would generate maximum value 622 that is equivalent to the G component 482. Similarly, max/min circuit 602 is configured to generate a minimum value 624 from the R component 482, G component 484, and B component 486. For example, if the minimum value amongst the R component 482, G component 484, and B component 486 is the G component 482, then the max/min circuit 602 would generate minimum value 624 that is equivalent to the G component 482. The max/min circuit 602 may also be configured to sum all of the R component 482, G component 484, and B component 486 to generate a summation value 632. Furthermore, the max/min circuit 602 may also pass the R component 482, G component 484, and B component 486 through unchanged.

The multiplexer may be programmed to select any of the maximum value 622, minimum value 624, R component 482, or B component 486 depending on the type of color model image being utilized. For example, for an HSI color model, the multiplexer 604 may be programmed to select the R component 482 as the output component 634 and the B component 486 as the output component 636. For an HSL color model, the multiplexer 604 may be programmed to select the maximum value 622 as the output component 634 and any of the components as the output component 636. For an HSV color model, the multiplexer 604 may be programmed to select the maximum value 622 as the output component 634 and the minimum value 624 as the output component 636.

The output components 634-636, along with the G component 484 then may be received by the weighted average calculation circuit 606. The weighted average calculation circuit 606 may be configured to generate the luminance component 488 according to:

Luminance Component $488(x,y) = W_1 C_{634}(x,y) + W_2 C_{636}(x,y) + W_3 C_{484}(x,y) + O_1$ where W1-W3 are various weight values, C634 is the output component 634, C636 is the output component 636, C484 is the G component 484, and O1 is an offset value. The weight values W1-3 and offset value O1 may be determined based on the type of image sensor 106. Thus, the weighted average calculation circuit 606 may be programmed to generate the weight values W1-W3 and the offset value O1 based on the type of color model image being utilized. For example, for an HSI color model, the weights W1-3 all may be assigned to 1/3 (85) while the offset is equal to zero. Thus, the luminance component 488 is:

$$\text{Luminance Component } 488(x, y) = \frac{R \text{ Component } 482 + G \text{ Component } 484 + B \text{ Component}}{3}$$

For an HSL color model, the weights W1-W2 may be assigned a 0.5 (128), while the weight W3 and the offset are set to zero. Thus, the luminance component 448 is:

$$\text{Luminance Component } 488(x, y) = \frac{\text{Maximum Value } 622 + \text{Minimum Value } 624}{2}$$

For an HSV color model, the weight W1 may be assigned a one, while the weights W2-3 and the offset are set to zero. Thus, the luminance component 448 is the maximum value 622. In alternative embodiments, the weights W1-3 and offset O1 may be set to any customizable values.

The saturation calculation circuit 608 may be configured to generate a numerator and denominator 638 for divider 610 to generate the S component 490. The saturation calculation circuit 608 may be configured to receive the maximum value 622, the minimum value 624, and the summation value 632 from the max/min circuit 602. The saturation calculation circuit 608 may be programmed to generate the numerator and denominator 638 depending on the type of color model image being utilized. For example, for an HSI color model, the saturation calculation circuit 608 may generate the numerator as the minimum value 624 and the denominator as the summation value 632. For an HSL color model, the saturation calculation circuit 608 may generate the numerator as the maximum value 622 minus the minimum value 624 and the denominator as a 25 5-Gray value. For an HSV color model, the saturation calculation circuit 608 may generate the numerator as the maximum value 622 minus the minimum value 624 and the maximum value 622.

The divider 610 is configured to implement the division for the color model being utilized. For example, for an HSI color model, the divider 610 may generate the S component 490 according to:

$$\text{Saturation Value } 638(x, y) = 1 - \frac{\text{Minimum Value } 624}{\text{Summation Value } 632}$$

For an HSL color model, the divider 610 may generate the S component 490 according to:

$$\text{Saturation Value } 638(x, y) = \frac{\text{Maximum Value } 622 - \text{Minimum Value } 624}{255 - \text{Gray Value}}$$

For an HSV color model, the divider 610 may generate the S component 490 according to:

$$\text{Saturation Value } 638(x, y) = \frac{\text{Maximum Value } 622 - \text{Minimum Value } 624}{\text{Maximum Value } 622}$$

Figure 7:
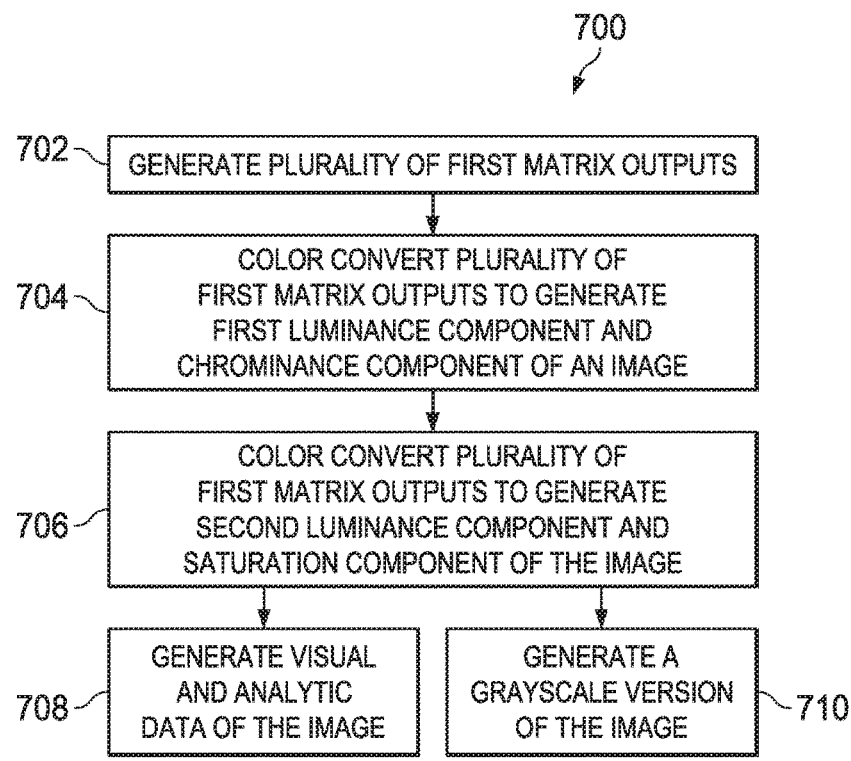
FIG. 7 shows an illustrative flow diagram of a method for color processing an image captured by an image sensor in accordance with various examples.

FIG. 7 shows an illustrative flow diagram of a method 700 for color processing an image captured by image sensor 106 in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 700, as well as other operations described herein, can be performed by the image signal processor 204 (including the color correction circuit 214) and implemented in logic and/or by a processor executing instructions stored in a non-transitory computer readable storage medium.

The method begins in block 702 with generating a plurality of first matrix outputs. For example, a 4D matrix processing circuit, such as 4D matrix processing circuit 304, may be configured to generate matrix outputs, such as matrix outputs 324*a-c*, based on received image components, such as image components 252*a-c*.

In block 704, the method 700 continues with color converting the plurality of first matrix outputs to generate a first luminance component and a chrominance component of an image. For example, a post processing circuit, such as post processing circuit 306, may be configured to generate a luminance component (i.e., Y component), such as luminance component 454, and two chrominance components (i.e., a U component and a V component), such as chrominance components 460, of the image. The method 700 continues in block 706 with color converting the plurality of first matrix outputs to generate a second luminance component and a saturation component of the image. For example, a non-linear matrix processing circuit, such as non-linear matrix processing circuit 310, may be configured to generate a luminance component (i.e., I component, L component, and/or V component), such as luminance component 488, and a saturation component (i.e., S component), such as S component 490.

In block 708, the method 700 continues with generating visual and analytic data of the image. For example, a split visual and analytics circuit, such as split visual and analytics circuit 308, may receive the first luminance component and the chrominance component, second luminance component and saturation component, and/or a red, green, and blue component and generate an 8 bit visual component and a 12 bit analytic component. The method 700 continues in block 710 with generating a grayscale version of the image. For example, a secondary output generation circuit, such as secondary output generation circuit 312, may be configured to receive the first and/or second luminance component and generate a grayscale version of the image.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A processor, comprising:
    a first matrix processing circuit configured to:
        receive a first component image and a second component image, the first and second component images based on image pixels;
        generate a first matrix output using a first matrix multiplication and a first weighted pixel value for the first component image;
        generate a second matrix output using a second matrix multiplication and a second weighted pixel value for the second component image; and
    a post processing circuit coupled to the first matrix processing circuit and configured to generate a first luminance component of the image pixels and a chrominance component of the image pixels using a first color conversion on the first and second matrix outputs;
    a second matrix processing circuit coupled to the first matrix processing circuit and configured to generate a second luminance component of the image pixels and a saturation component of the image pixels using a second color conversion on the first and second matrix outputs; and
    a visual and analytics circuit coupled to the post processing circuit and the second matrix processing circuit, the visual and analytics circuit configured to receive the first luminance component, the chrominance component, the second luminance component, and the saturation component;
    wherein the visual and analytics circuit is configured to generate analytic data of the image pixels based on the chrominance component; and
    wherein the visual and analytics circuit is configured to generate visual data of the image pixels based on one of the first luminance component, the second luminance component, the chrominance component, and the saturation component.

2. The processor of claim 1, further comprising a secondary output generation circuit configured to generate a grayscale version of the image pixels based on the first luminance component or the second luminance component.

3. The processor of claim 1, wherein the first matrix processing circuit is configured to:
    generate the first weighted pixel value by multiplying a first weight by a pixel value of the first component image;
    generate the second weighted pixel value by multiplying a second weight by a pixel value of the second component image; and
    add the first, and second weighted pixel values.

4. The processor of claim 3, wherein the first and second weights are based on a type of the image sensor.

5. The processor of claim 3, wherein the first and second component images are a part of four component images and the first and second matrix outputs are a part of three first matrix outputs.

6. The processor of claim 1, wherein the second matrix processing circuit includes:
    a maximum/minimum circuit configured to receive the first and second matrix outputs and determine, a maximum value of the first and second matrix outputs and a minimum value of the first and second matrix outputs; and
    a weighted average calculation circuit configured to generate the second luminance component based on weighting outputs of the maximum/minimum circuit based on a type of image sensor.

7. The processor of claim 6, wherein the second matrix processing circuit further comprises a saturation calculation circuit configured to determine the saturation component of the image pixels based on outputs of the maximum/minimum circuit.

8. The processor of claim 1, wherein:
    the analytic data of the image pixels comprises a Y component of a YUV color model; and
    the visual data of the image pixels comprises a Y component, a U component, and a V component of the YUV color model or a red component, a blue component, and a green component of a RGB color model.

9. The processor of claim 1, wherein the first luminance component of the image pixels comprises a Y component and the chrominance component of the image pixels comprises a U component and a V component of a YUV color model.

10. The processor of claim 1, wherein the second luminance component of the image pixels comprises an L component or a V component and the saturation component comprises an S component of an HSL or HSV color model.

11. A system, comprising:
    a filter array configured to filter electromagnetic waves;
    an image sensor coupled to the filter array and configured to generate a plurality of image pixels; and
    an image sub-system including an image signal processor configured to:
        generate first and second component images based on the plurality of image pixels;
        generate a first matrix output using a first matrix multiplication, a first offset, and a first weighted pixel value;
        generate a second matrix output using a second matrix multiplication, a second offset, and a second weighted pixel value;

generate a first luminance component and a chrominance component of the plurality of image pixels using a first color conversion on the first and second matrix outputs;

generate a second luminance component and a saturation component of the plurality of image pixels using a second color conversion on the first and second matrix outputs; and generate visual data and analytic data of the plurality of image pixels.

12. The system of claim 11, wherein the image signal processor is further configured to generate a grayscale version of the plurality of image pixels based on the first luminance component or the second luminance component.

13. The system of claim 11, wherein the image signal processing is further configured to:

generate the first weighted pixel value by multiplying a first weight by a pixel value of the first component image;

generate the second weighted pixel value by multiplying a second weight by a pixel value of a second component image; and add the first and second weighted pixel values.

14. The system of claim 13, wherein the first and second weights are based on a type of the image sensor.

15. The system of claim 11, wherein:

the analytic data of the image pixels comprises a Y component of a YUV color model; and the visual data of the image pixels comprises a Y component, a U component, and a V component of the YUV color model or a red component, a blue component, and a green component of a RGB color model.

16. The system of claim 11, wherein the first luminance component of the image pixels comprises a Y component and the chrominance component of the image pixels comprises a U component and a V component of a YUV color model.

17. The system of claim 11, wherein the second luminance component of the image pixels comprises an L component or a V component and the saturation component comprises an S component of an HSL or HSV color model.

18. A method comprising:

generating a first matrix output using a first matrix multiplication, a first offset, and a first weighted pixel value for a first component image, the first component image based on image pixels;

generating a second matrix output using a second matrix multiplication, a second offset, and a second weighted pixel value for a second component image, the second component image based on image pixels;

generating a first luminance component and a chrominance component of the image pixels using a first color conversion on the first and second matrix outputs;

generating a second luminance component and a saturation component of the image pixels using a second color conversion on the first and second matrix outputs; and generating visual data and analytic data of the image pixels.

19. The method of claim 18, further comprising generating a grayscale version of the image pixels based on the first luminance component or the second luminance component.

20. The method of claim 18, further comprising:

generating the first weighted pixel value by multiplying a first weight by a pixel value of a first component image;

generating the second weighted pixel value by multiplying a second weight by a pixel value of a second component image; and adding the first and second weighted pixel values.

* * * * *